(12) United States Patent
Sridhara et al.

(10) Patent No.: US 11,710,098 B2
(45) Date of Patent: Jul. 25, 2023

(54) PROCESS FLOW DIAGRAM PREDICTION UTILIZING A PROCESS FLOW DIAGRAM EMBEDDING

(71) Applicant: International Business Machines Corporation, Armonk, NY (US)

(72) Inventors: Giriprasad Sridhara, Bangalore (IN); Neelamadhav Gantayat, Bangalore (IN); Sampath Dechu, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 469 days.

(21) Appl. No.: 16/832,594

(22) Filed: Mar. 27, 2020

(65) Prior Publication Data

US 2021/0304139 A1 Sep. 30, 2021

(51) Int. Cl.
*G06F 17/00* (2019.01)
*G06Q 10/10* (2023.01)
*G06Q 10/0633* (2023.01)
*G06F 40/30* (2020.01)
*G06N 5/04* (2023.01)
*G06F 40/253* (2020.01)
*G06N 20/00* (2019.01)

(52) U.S. Cl.
CPC .......... *G06Q 10/10* (2013.01); *G06F 40/253* (2020.01); *G06F 40/30* (2020.01); *G06N 5/04* (2013.01); *G06N 20/00* (2019.01); *G06Q 10/0633* (2013.01)

(58) Field of Classification Search
CPC ......... G06F 40/253; G06F 40/30; G06N 5/04; G06N 20/00; G06Q 10/0633; G06Q 10/10

USPC ....................... 715/211; 706/12, 21; 705/121
See application file for complete search history.

(56) References Cited

U.S. PATENT DOCUMENTS 8,949,773 B2  2/2015  Paradkar et al.
10,614,057 B2 * 4/2020  Mullins ................. G06F 21/445
(Continued)

OTHER PUBLICATIONS

Liu, Enabling effective workflow model reuse: A data-centric approach, Decision Support Systems, 2017 (Year: 2017).*
(Continued)

*Primary Examiner* — Stephen S Hong
*Assistant Examiner* — Matthew J Ludwig
(74) *Attorney, Agent, or Firm* — Ference & Associates LLC

(57) ABSTRACT

One embodiment provides a method, including: receiving a process flow diagram element of a process flow diagram; identifying a context of the process flow diagram element, wherein the identifying a context comprises identifying (i) categories of elements connected to the process flow diagram element, (ii) swimlanes within the process flow diagram, and (iii) text included in the process flow diagram; encoding features of the process flow diagram element into a semantic vector, wherein the features are identified from the context of the process flow diagram element; and predicting, utilizing a process flow diagram model, a process flow diagram element for the process flow diagram based upon the at least one process flow diagram element, wherein the process flow diagram model receives and analyzes the features of the at least one process flow diagram and outputs the predicted process flow diagram element.

17 Claims, 3 Drawing Sheets

(56) References Cited

U.S. PATENT DOCUMENTS

| | | | |
|---|---|---|---|
| 10,628,282 B2* | 4/2020 | Soares | G06F 11/3636 |
| 10,789,119 B2* | 9/2020 | Lehmann | G06F 11/0775 |
| 10,885,114 B2* | 1/2021 | Mullins | G06F 16/285 |
| 10,963,634 B2* | 3/2021 | Menahem | G06F 40/284 |
| 11,151,372 B2* | 10/2021 | Kakrana | H04N 13/261 |
| 11,205,103 B2* | 12/2021 | Zhang | G06N 20/10 |
| 11,372,380 B2* | 6/2022 | Iyer | G06N 20/00 |
| 2011/0004565 A1 | 1/2011 | Stephenson et al. | |
| 2012/0062574 A1* | 3/2012 | Dhoolia | G06V 30/422 |
| | | | 345/506 |
| 2014/0278690 A1* | 9/2014 | Agarwal | G06Q 10/0633 |
| | | | 705/7.22 |
| 2014/0365403 A1* | 12/2014 | Demuth | G06N 20/00 |
| | | | 706/11 |
| 2015/0032499 A1* | 1/2015 | Duftler | G06Q 10/0633 |
| | | | 705/7.27 |
| 2016/0035114 A1* | 2/2016 | Hesse | G06Q 10/067 |
| | | | 345/440 |
| 2016/0063422 A1* | 3/2016 | Chen | G06Q 10/067 |
| | | | 705/7.26 |
| 2016/0180263 A1* | 6/2016 | Mourra | G06F 3/04817 |
| | | | 705/7.27 |
| 2018/0060779 A1* | 3/2018 | Suri | G06Q 10/06316 |
| 2020/0050983 A1* | 2/2020 | Balasu | G06F 11/3423 |
| 2020/0342369 A1* | 10/2020 | Sridhara | G06F 40/30 |
| 2021/0026735 A1* | 1/2021 | Hall | G06F 11/1407 |

OTHER PUBLICATIONS

Szymon Bobek et al., "Application of Bayesian Networks to Recommendations in Business Process Modeling", AIBP 2013, 11 pages, AIBP.

Krzysztof Kluza et al., "Overview of Recommendation Techniques in Business Process Modeling", KESE 2013, 13 pages, ResearchGate.

Shuiguang Deng et al., "A Recommendation System to Facilitate Business Process Modeling", IEEE Transactions on Cybernetics, 2016 IEEE, 15 pages, IEEE.

* cited by examiner

PROCESS FLOW DIAGRAM PREDICTION UTILIZING A PROCESS FLOW DIAGRAM EMBEDDING

BACKGROUND

Processes are employed by entities and people. Generally, a process is any type of process that has more than one step. In other words, a process can range from something as simple as a process for tying a shoe to something as complicated as a process for building a skyscraper. Many of these processes are defined by a process flow that identifies the steps that are to be performed, an order of the steps to be performed, any entity that is responsible for a particular step, and the like. This process flow, and, thereby, the process, may be graphically represented using a process flow diagram (e.g., business process model, unified modeling language activity diagram, etc.) that uses different shapes for representing different types of tasks or steps (e.g., rectangles for performing tasks, diamonds for decision tasks, etc.), edges for connecting the shapes to delineate a connection between tasks, edges with arrows to designate a temporal order of the tasks, swimlanes that designate responsible entities, and the like.

BRIEF SUMMARY

In summary, one aspect of the invention provides a method, comprising: receiving a process flow diagram element of a process flow diagram; identifying a context of the process flow diagram element, wherein the identifying a context comprises identifying (i) categories of elements connected to the process flow diagram element, (ii) swimlanes within the process flow diagram, and (iii) text included in the process flow diagram; encoding features of the process flow diagram element into a semantic vector, wherein the features are identified from the context of the process flow diagram element; and predicting, utilizing a process flow diagram model, a process flow diagram element for the process flow diagram based upon the at least one process flow diagram element, wherein the process flow diagram model receives and analyzes the features of the at least one process flow diagram and outputs the predicted process flow diagram element.

Another aspect of the invention provides an apparatus, comprising: at least one processor; and a computer readable storage medium having computer readable program code embodied therewith and executable by the at least one processor, the computer readable program code comprising: computer readable program code configured to receive a process flow diagram element of a process flow diagram; computer readable program code configured to identify a context of the process flow diagram element, wherein the identifying a context comprises identifying (i) categories of elements connected to the process flow diagram element, (ii) swimlanes within the process flow diagram, and (iii) text included in the process flow diagram; computer readable program code configured to encode features of the process flow diagram element into a semantic vector, wherein the features are identified from the context of the process flow diagram element; and computer readable program code configured to predict, utilizing a process flow diagram model, a process flow diagram element for the process flow diagram based upon the at least one process flow diagram element, wherein the process flow diagram model receives and analyzes the features of the at least one process flow diagram and outputs the predicted process flow diagram element.

An additional aspect of the invention provides a computer program product, comprising: a computer readable storage medium having computer readable program code embodied therewith, the computer readable program code executable by a processor and comprising: computer readable program code configured to receive a process flow diagram element of a process flow diagram; computer readable program code configured to identify a context of the process flow diagram element, wherein the identifying a context comprises identifying (i) categories of elements connected to the process flow diagram element, (ii) swimlanes within the process flow diagram, and (iii) text included in the process flow diagram; computer readable program code configured to encode features of the process flow diagram element into a semantic vector, wherein the features are identified from the context of the process flow diagram element; and computer readable program code configured to predict, utilizing a process flow diagram model, a process flow diagram element for the process flow diagram based upon the at least one process flow diagram element, wherein the process flow diagram model receives and analyzes the features of the at least one process flow diagram and outputs the predicted process flow diagram element.

A further aspect of the invention provides a method, comprising: training a machine-learning model, wherein the training comprises (i) receiving developed process flow diagrams, (ii) converting the developed process flow diagrams into feature vectors, and (iii) generating a training dataset from the feature vectors, wherein the converting comprises identifying a context of process flow diagram elements within the process flow diagram and wherein the feature vectors are based upon the context of a given process flow diagram element; receiving an undeveloped process flow diagram comprising at least one process flow diagram element; converting the undeveloped process flow diagram into at least one feature vector, wherein the converting comprises (iv) identifying a context of the at least one process flow diagram element and (v) representing (a) the context and (b) the at least one process flow diagram as a feature vector; and generating a prediction with respect to the undeveloped process flow diagram utilizing the at least one feature vector of the undeveloped process flow diagram, wherein the generating comprises (vi) providing the at least one feature vector to the machine-learning model and (vii) receiving the prediction from the machine-learning model.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
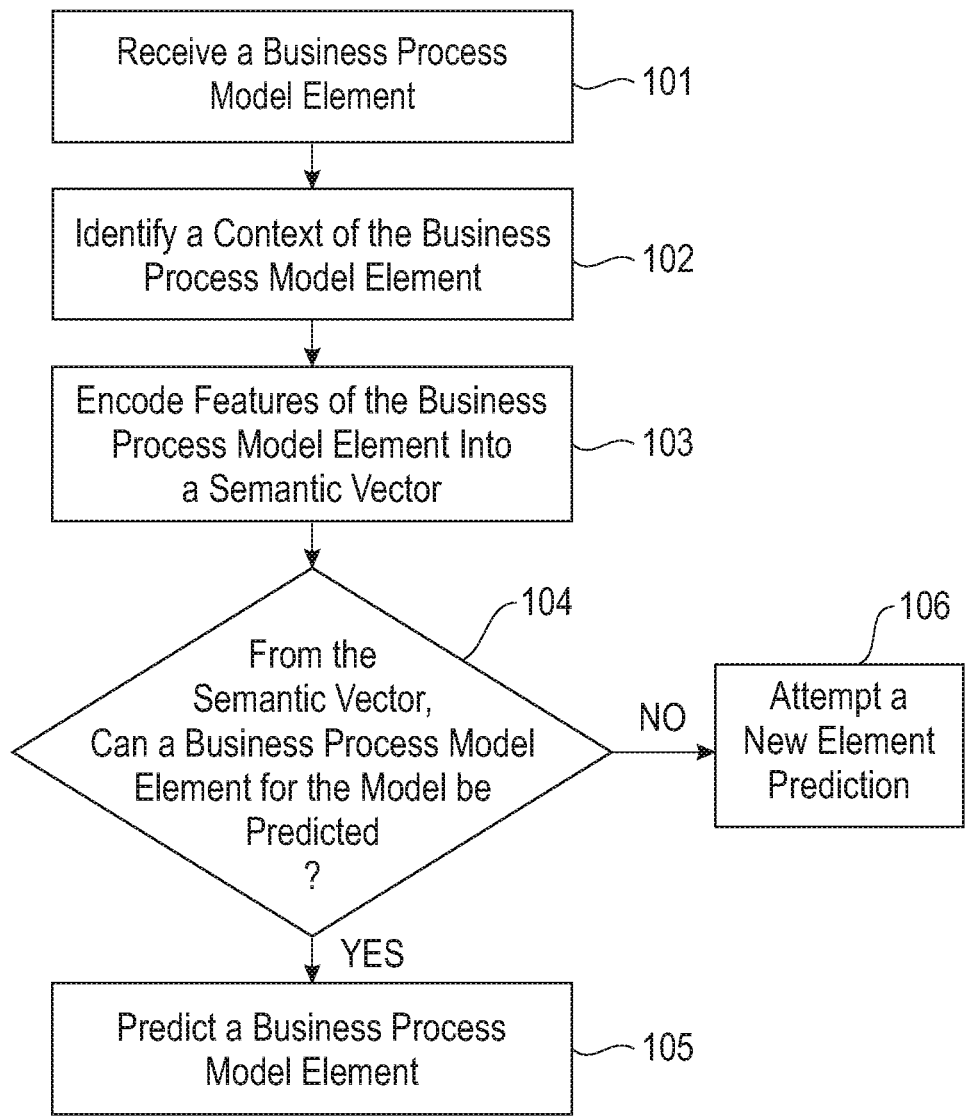
FIG. 1 illustrates a method of making predictions with respect to a process flow diagram by converting process flow diagram elements and the process flow diagram context to vectors and utilizing a process flow diagram embedding that ingests the vectors and makes predictions based upon the ingested vectors.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Typical process flow diagrams are very complicated and include many different activities represented by geometrical shapes and connections between the different activities represented by edges. A traditional process flow diagram includes an activity shape for each possible activity that can occur within the process. Additionally, edges are used to connect activities to illustrate a temporal ordering of the activities. In order to be precise, the process flow diagram has every possible activity that could occur within the process. However, since many processes include many different possible activities, the process flow diagrams become very complicated. For example, a process flow diagram for a fairly simple process can have twenty or more activities.

As the process gets more complicated and includes more activities, the model can easily have more than a hundred activities. In order to generate the process flow diagram, a user or group of users has to identify every possible task within the process, each connection to the task, users or entities responsible for a task, and the like. With so many activities, it can be hard for a user to identify what activity should come next within the process flow diagram. Users who are not well-versed in process flow diagram layouts, features, and language, may find it particularly difficult to create an accurate process flow diagram. There are no conventional techniques that can assist in predicting process flow diagram elements, where each process flow diagram element represents an activity within the process flow diagram. Additionally, once a process flow diagram element is chosen, there is no conventional technique that is able to identify the accuracy of the chosen element type, text within the element, connections to the element, or the like. The reason that conventional systems for predicting either another process flow diagram element within the process flow diagram or an accuracy of a current process flow diagram element do not exist is because there is no technique for learning process flow diagram elements and combinations. Additionally, for this same reason, there is not a technique that allows for searching similar process flow diagrams within a process flow diagram catalog.

Accordingly, an embodiment provides a system and method for making predictions with respect to a process flow diagram by converting process flow diagram elements and the process flow diagram context to vectors and utilizing a process flow diagram embedding that ingests the vectors and makes predictions based upon the ingested vectors. The system receives a process flow diagram element that is included in a process flow diagram. The process flow diagram may be one that is being developed. A process flow diagram element is an element within the process flow diagram that corresponds to an activity or task within the process flow diagram. The element has a corresponding type (e.g., activity, decision, gateway, etc.), swimlane which corresponds to the entity responsible for performance of the element, and may include text within the element. From the information associated with the element, the system can identify a context of the element. The context refers to an environment of the element within the process flow diagram. Thus, the context includes identifying types of elements that are connected to the element, swimlanes included within the process flow diagram, text included in the process flow diagram, milestones, and the like.

Utilizing the context of the element, the system encodes features of the element into a semantic or feature vector. The features are identified from the context of the element within the process flow diagram. Once the element and all other elements within the process flow diagram are encoded into vectors, the system can make a prediction with respect to a process flow diagram. To make a prediction, the vector is provided to an embedding that ingests the features of the element. The embedding is like a machine-learning model that is specifically trained on process flow diagrams and elements. The training includes creating a training dataset of previously developed process flow diagrams that are converted to vectors. Thus, the embedding is able to predict other elements that should be included in the process flow diagram and is also able to make predictions regarding the accuracy of elements that are already included in the process flow diagram. Additionally, the embedding can be used to search for other process flow diagrams that are similar to the current process flow diagram.

Such a system provides a technical improvement over current systems for process flow diagram generation. The described system creates a novel technique for representing process flow diagram elements as semantic or feature vectors. By converting the process flow diagram elements into a vector, the system can modify a traditional word embedding technique to work with the process flow diagrams. Accordingly, the described system and method provide a technique that allows for training a model utilizing developed process flow diagrams that have been converted to vectors. Once the model is trained, the model can be used to make predictions regarding process flow diagram elements within the process flow diagram, for example, predicting a previous or subsequent process flow diagram element with respect to a received element, predicting an accuracy of a received element, or the like. Additionally, the ability to convert the elements into vectors allows for executing queries across developed process flow diagrams that have been converted to vectors. Thus, the described system and method provide a technique for performing predictions and searches utilizing process flow diagram elements that is not possible with the conventional techniques, thereby providing a system that makes generation of process flow diagrams quicker and more accurate than conventional techniques and also more accessible to users who may not be as well-versed in process flow diagrams.

FIG. 1 illustrates a method for making predictions with respect to a process flow diagram by converting process flow diagram elements and the process flow diagram context to vectors and utilizing a process flow diagram embedding that ingests the vectors and makes predictions based upon the ingested vectors. At 101 the system receives a process flow diagram element of a process flow diagram. The process flow diagram represents a process flow having a plurality of steps for performing a process. A process may be any type of process that may be defined using a process map, process flow diagram, or procedure steps. For example, a process may be related to a service provided by an entity, for example, loan approvals, vehicle registrations, invoice processing, infrastructure or building planning, scheduling, or the like. As another example, a process may be related to a method or steps that are carried out by an entity (e.g., user, corporation, etc.). For example, a process may be related to steps for withdrawing money from an automated teller machine (ATM), the steps required for hiring a new employee, or the like.

The process may be defined by a process flow that identifies the different steps for performing the process, the temporal ordering of the steps, steps requiring input from other steps, users responsible for particular steps, and any other parameters required for proper performance of the process. Thus, the process flow diagram includes a graphical representation of the process flow, activities within the process flow, temporal ordering of the steps, and the like. Activities within a process flow diagram are generally represented by geometrical shapes, referred to as process flow diagram elements. Different types of activities are generally represented by different shapes or elements, for example, rectangles for performing activities or tasks, diamonds for decision activities or tasks, and the like. Activities or tasks having a relationship are connected by edges. If the activities have a temporal ordering or dependency (e.g., one activity has to occur before another, etc.), these activities are generally connected by edges having arrows.

Additionally, traditional process flow diagram graphical representations may include swimlanes. Swimlanes include groupings of activities or tasks. Depending on the type of process flow diagram, the groupings may be based upon different criteria. For example, in some process flow diagrams, the groupings, and, therefore, the swimlanes, are based upon the responsible entities or user. For example, all the tasks that are to be performed by a project manager would be grouped in a swimlane that corresponds to the project manager. As another example, tasks to be performed by an engineer would be grouped into a different swimlane that corresponds to the engineer. Other process flow diagrams may group the activities based upon a larger activity set. For example, if the process flow diagram is directed to paying a vendor, the process flow diagram may include three different larger activity sets, each represented by a swimlane. Each of these activity sets may then include activities that are represented within the process flow diagram as shapes, with the activities of an activity set being included in the swimlane corresponding to the activity set.

Process flow diagrams may also include additional information, for example, text within the process flow diagram (e.g., text in an activity element, text associated with a swimlane, a title, etc.), milestones, gateways, and the like. Milestones are those activities or groups of activities that, once completed, represent a significant milestone. For example, some milestones may be associated with payments, where upon reaching the milestone a payment is due or received. As another example, some milestones may be associated with a portion of a larger project being completed, where upon reaching the milestone that portion of the project is considered finished. Gateways represent decision tasks, or those tasks that have more than one output. Depending on the response to the query associated with the decision task, the process flow may continue in one of a plurality of flow directions.

Figure 2:
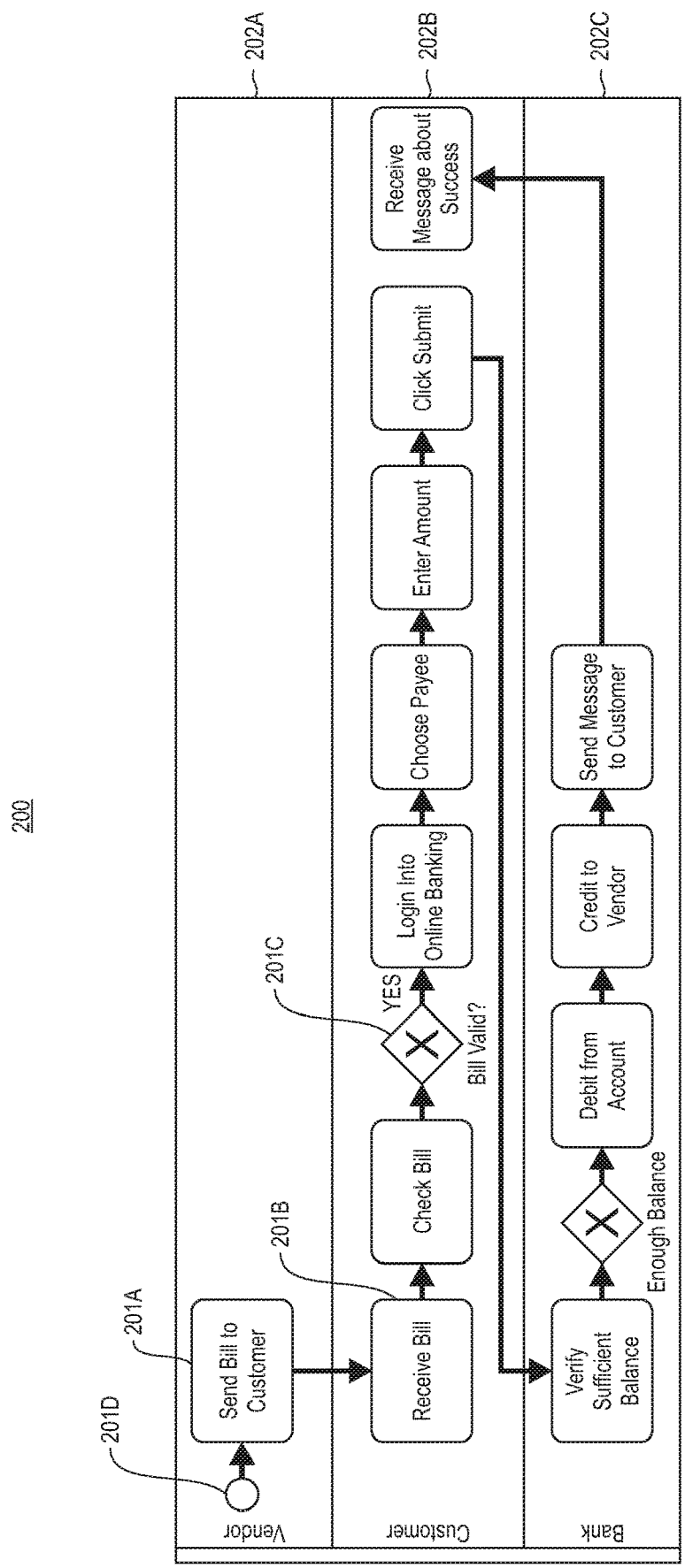
FIG. 2 illustrates an example process flow diagram.

FIG. 2 illustrates an example process flow diagram 200. This process flow diagram 200 is associated with a process for billing a customer and receiving payment for the same. Element 201A represents an activity element and is, therefore, represented with a rectangle shape. This element 201A is connected to element 201B by a temporal connection, or a line having an arrow. This process flow diagram 200 also includes a decision or gateway element 201C. For simplicity, this process flow diagram 200 only illustrates the flow from the gateways with a positive response and does not illustrate the flow from the gateways with a negative response. Element 201D corresponds to a start element. The process flow diagram 200 also includes three swimlanes 202A, 202B, and 202C, each associated with the entity that would perform the tasks associated with the elements included in the corresponding swimlane. For simplicity, the illustrated process flow diagram 200 does not illustrate some other features that may be included in process flow diagrams, for example, milestones, other element types, connections to other process flow diagrams, and the like.

At 102 the system identifies a context of the process flow diagram element, also referred to as a target element. The context is the information surrounding the element within the process flow diagram. Thus, the context can include any information within the process flow diagram, for example, the element types of the elements connected to the target element, the swimlanes within the process flow diagram, and text included in the process flow diagram. Other information that may be captured includes, milestones, whether connecting elements have a temporal connection, dependencies within the model, and the like. To identify the elements types of the connecting elements, the system may identify the connecting element through a control flow analysis. The process flow diagram represents a flow or process. Thus, a control flow analysis analyzes that flow, including task dependencies, adjacently connected tasks, and an overall flow of the model from start to finish, including all branches within the process flow diagram.

In identifying the context, the system can analyze the text included in the process flow diagram, for example, the text included in the elements and swimlanes. Text can be analyzed using natural language or other text analysis techniques. Thus, the system can learn about the process flow diagram through the text in the process flow diagram. For example, the system may use linguistic processing to apply parts-of-speech identification on the elements. The system may first apply the parts-of-speech identification on individual elements. Once the parts-of-speech within the text of the elements have been identified, the system can use that information to identify a relationship between parts-of-speech recognized within one element and parts-of-speech recognized within another element. For example, if one element includes "send" this may be identified as an action. If the next element includes "receive" this may also be identified as an action. Thus, the actions of the elements can be aggregated to understand a context of the elements, for example, that once something is sent by one entity, it must be received by another entity. Accordingly, identifying a "sending" element may indicate that the process flow diagram should include a "receiving" element. Other types of linguistic processing, for example, natural language processing, semantic analysis, syntactic analysis, and the like may also be used in identifying a context.

At 103 the system encodes features of the target element into a semantic or feature vector. While a single element is discussed herein, it should be understood that the encoding may occur across some or all elements within the model. The features for the vector are identified from the context of the target element. Accordingly, a single element may be included in more than vector since the vectors are generated from the context surrounding a target element and that context may include other elements. The features included in the vector may include any of the contextual information and, thus, may include features like element type, swimlane, milestone, text, and the like. The vector is generated from a set of contiguous elements within the process flow diagram, with the elements surrounding the target element making up at least a portion of the context for the target element. Each element within the vector includes the information associated with that element, for example, the swimlane, milestone, text, parts-of-speech analysis, element type, and the like. To encode the features into a vector, the system may utilize an encoder that produces a hidden state that is a representation of the features within each element.

The vectors may be utilized to make predictions regarding the process flow diagram. Thus, at 104, the system may determine if, from the semantic vector, a process flow diagram element for the model be predicted. To make a prediction, the system may utilize a process flow diagram embedding or machine-learning model that is designed for process flow diagram elements. The process flow diagram embedding is trained utilizing semantic or feature vectors that correspond to combinations of process flow diagram elements included in previously developed process flow diagrams. In other words, previously developed process flow diagrams are converted to semantic or feature vectors corresponding to the elements within the process flow diagram. As with the target element, the semantic vectors of the elements within the previously developed process flow diagrams are generated from an element and the context of the element, which includes the features of adjacent elements. These semantic vectors are then turned into a training dataset for the embedding.

Accordingly, to make a prediction, the process flow diagram embedding ingests the semantic vector of the target element, analyzes the semantic vector against the training dataset, and outputs a predicted element. To make a prediction, the system may utilize a decoder which is a neural language model that conditions on the output of the encoder, specifically, the representation of the features within each element. One prediction may be a prediction associated with an element that is not currently included in the process flow diagram. In other words, this type of prediction is a prediction of an element that should be included within the process flow diagram and the information that should be associated with this element (e.g., milestone, element type, text, swimlane, etc.).

In a simplistic explanation, the system takes the target element as input and, utilizing the embedding or machine-learning model, is able to identify elements that occur with the target element based upon the training dataset, and make a prediction or recommendation based upon these identified elements. In this type of prediction, one decoder can be utilized to decode the features within a vector representing an element occurring before the target element, and another decoder may be utilized to decode the features within a vector representing an element occurring subsequent to the target element. The output of the decoder is the vector represented as a process flow diagram element, or, stated differently, an element in its natural state. Thus, the system may reconstruct a semantic vector for a previous or subsequent element based upon the features of the target element. The system can then revert the reconstructed semantic vector of the predicted element into a process flow diagram element including text, an identified swimlane, an element type, and the like.

Another prediction may be a prediction associated with an element that is currently included in the process flow diagram. This type of prediction allows for verifying the accuracy or correctness of a process flow diagram element. This prediction works in a similar fashion as the previous type of prediction, except, instead of predicting elements that are surrounding the target element, the system utilizes the surrounding elements to predict the target element, and, specifically, features of the target element. Once the features are predicted, the system can compare the predicted features with the current features of the target element. The system can reconstruct the semantic vector and then revert the semantic vector into a target element, as with the previous type of prediction. If there is a mismatch between the predicted features and current features of the target element, the system may notify a user of the mismatch and present the predicted features of the target element for analysis by the user.

If a prediction can be made at 104, the system may provide the prediction to a user at 105. Providing the prediction may include presenting a display, for example, a pop-up window, portion of an application window, or the like, with the prediction. Alternatively, the system may simply populate the process flow diagram with the prediction. In either case, the user may then make modifications to the predicted element, for example, text included in the element, a swimlane selection, a milestone that the element occurs under, or the like. If, on the other hand, the system cannot make a prediction at 104, the system may attempt to predict a different element at 106. For example, the process flow diagram may not include enough context to make a prediction for a particular element. Thus, the system may attempt to create additional context by predicting other elements within the process flow diagram. As another example, the embedding may not be familiar with a particular target element and, therefore, may not be able to make a prediction and so, instead, may attempt to make a different element prediction.

The system can also use the vectors to search previously developed process flow diagrams, for example, to find a process flow diagram that is similar to the target process flow diagram. First, the system generates a process flow diagram catalog by converting all the previously developed process flow diagrams into semantic or feature vectors. Then, the system can compare the semantic vectors of the target process flow diagram to the semantic vectors within the catalog. For each comparison, the system can calculate a similarity of the target semantic vector to the semantic vectors within the catalog utilizing one or more similarity techniques, for example, similarity measures, cosine similarity, clustering techniques, affinity measurements, class distribution measures, and the like.

The calculated similarity results in a score that can be compared to a threshold similarity score value. This threshold value may be set by a user or a default value. A similarity score meeting or exceeding the threshold value indicates that the target semantic vector is similar to the semantic vector to which it is being compared. The system can then return this vector, represented as process flow diagram elements, a portion of the process flow diagram, or the entirety of the process flow diagram, to the user who provided the query.

Thus, the described systems and methods represent a technical improvement over current systems for process flow diagram generation. Rather than needing users who are well-versed in process flow diagram generation, the described system and method provide a technique that makes generating process flow diagrams accessible to even those users who are not as familiar with the process flow diagram language. Since the system converts the process flow diagram elements and context into feature vectors, the system can use an embedding to make predictions regarding process flow diagram elements that should be included in the process flow diagram and also regarding the accuracy of the currently included process flow diagram elements. Additionally, the feature vectors can be utilized to search for similar process flow diagrams that have already been developed which may reduce the length of time necessary for generating a complete process flow diagram from scratch. Thus, the described system and method provides a system that result in faster and more accurate process flow diagram generation. Additionally, the described system and method makes generation of process flow diagrams more accessible to more users.

Figure 3:
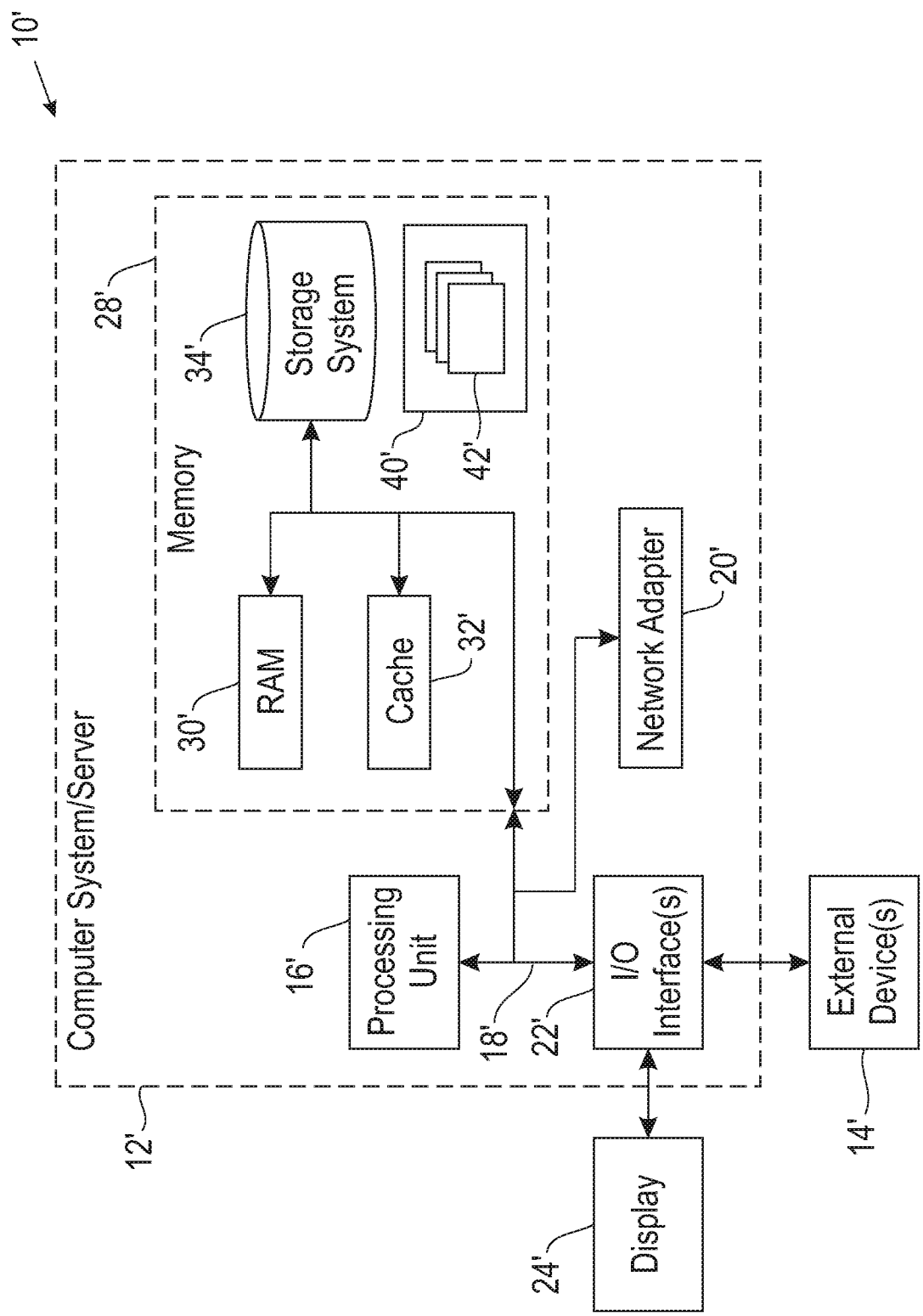
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
    receiving a process flow diagram element of a process flow diagram;
    identifying a context of the process flow diagram element, wherein the identifying a context comprises identifying (i) categories of elements connected to the process flow diagram element, (ii) swimlanes within the process flow diagram, and (iii) text included in the process flow diagram;
    encoding features of the process flow diagram element into a semantic vector, wherein the features are identified from the context of the process flow diagram element and wherein the features comprise at least element type, swimlane, milestone, and text corresponding to the process flow diagram element; and
    predicting, utilizing a process flow diagram embedding, a predicted process flow diagram element for the process flow diagram based upon the process flow diagram element, wherein the process flow diagram embedding receives and analyzes the features of the process flow diagram and outputs the predicted process flow diagram element, wherein the process flow diagram embedding ingests the semantic vector of the process flow diagram element, analyzes the semantic vector of the process flow diagram element against a training dataset, and outputs a semantic vector for the predicted process flow diagram element, wherein the predicting comprises converting the semantic vector for the predicted process flow diagram element into the predicted process flow diagram element, wherein the training dataset is generated by converting elements and contexts of the elements of previously developed process flow diagrams into training semantic vectors and aggregating the training semantic vectors into the training dataset.

2. The method of claim 1, wherein the identifying element types of elements connected to the process flow diagram element comprises identifying the elements connected to the process flow diagram element, by analyzing a control flow of the process flow diagram.

3. The method of claim 1, wherein the predicting comprises verifying an accuracy of the at least one process flow diagram element.

4. The method of claim 1, comprising generating a process flow diagram catalog of previously developed process flow diagrams.

5. The method of claim 4, comprising identifying a particular process flow diagram from the process flow diagram catalog, the particular process flow diagram being similar to the process flow diagram, wherein the identifying a particular process flow diagram from the process flow diagram catalog comprises (i) converting the previously generated process flow diagrams within the process flow diagram catalog into semantic vectors, (ii) comparing the semantic vectors of the process flow diagram against the semantic vectors of the previously developed process flow diagrams, and (iii) identifying a previously developed process flow diagram whose similarity to the process flow diagram exceeds a predetermined similarity threshold.

6. The method of claim 1, wherein the identifying a context comprises representing process flow diagram elements within the process flow diagram as parts-of-speech, by utilizing linguistic processing.

7. The method of claim 1, wherein the predicting comprises reconstructing a semantic vector for at least one of (i) a previous process flow diagram element and (ii) a subsequent process flow diagram element, in view of the semantic vector of the process flow diagram element.

8. The method of claim 7, wherein the predicting comprises reverting the semantic vector of the predicted element into a process flow diagram element including (i) text, (ii) an identified swimlane, and (iii) an element type.

9. An apparatus, comprising:
    at least one processor; and
    a computer readable storage medium having computer readable program code embodied therewith and executable by the at least one processor, the computer readable program code comprising:
    computer readable program code configured to receive a process flow diagram element of a process flow diagram;
    computer readable program code configured to identify a context of the process flow diagram element, wherein the identifying a context comprises identifying (i) categories of elements connected to the process flow diagram element, (ii) swimlanes within the process flow diagram, and (iii) text included in the process flow diagram;
    computer readable program code configured to encode features of the process flow diagram element into a semantic vector, wherein the features are identified from the context of the process flow diagram element and wherein the features comprise at least element type, swimlane, milestone, and text corresponding to the process flow diagram element; and
    computer readable program code configured to predict, utilizing a process flow diagram embedding, a predicted process flow diagram element for the process flow diagram based upon the process flow diagram element, wherein the process flow diagram embedding receives and analyzes the features of the process flow diagram and outputs the predicted process flow diagram element, wherein the process flow diagram embedding ingests the semantic vector of the process flow diagram element, analyzes the semantic vector of the process flow diagram element against a training dataset, and outputs a semantic vector for the predicted process flow diagram element, wherein the predicting comprises converting the semantic vector for the predicted process flow diagram element into the predicted process flow diagram element, wherein the training dataset is generated by converting elements and contexts of the elements of previously developed process flow diagrams into training semantic vectors and aggregating the training semantic vectors into the training dataset.

10. A computer program product, comprising:
a computer readable storage medium having computer readable program code embodied therewith, the computer readable program code executable by a processor and comprising:
computer readable program code configured to receive a process flow diagram element of a process flow diagram;
computer readable program code configured to identify a context of the process flow diagram element, wherein the identifying a context comprises identifying (i) categories of elements connected to the process flow diagram element, (ii) swimlanes within the process flow diagram, and (iii) text included in the process flow diagram;
computer readable program code configured to encode features of the process flow diagram element into a semantic vector, wherein the features are identified from the context of the process flow diagram element and wherein the features comprise at least element type, swimlane, milestone, and text corresponding to the process flow diagram element; and
computer readable program code configured to predict, utilizing a process flow diagram embedding, a predicted process flow diagram element for the process flow diagram based upon the process flow diagram element, wherein the process flow diagram embedding receives and analyzes the features of the process flow diagram and outputs the predicted process flow diagram element, wherein the process flow diagram embedding ingests the semantic vector of the process flow diagram element, analyzes the semantic vector of the process flow diagram element against a training dataset, and outputs a semantic vector for the predicted process flow diagram element, wherein the predicting comprises converting the semantic vector for the predicted process flow diagram element into the predicted process flow diagram element, wherein the training dataset is generated by converting elements and contexts of the elements of previously developed process flow diagrams into training semantic vectors and aggregating the training semantic vectors into the training dataset.

11. The computer program product of claim 10, wherein the identifying element types of elements connected to the process flow diagram element comprises identifying the elements connected to the process flow diagram element, by analyzing a control flow of the process flow diagram.

12. The computer program product of claim 10, wherein the predicting comprises verifying an accuracy of the at least one process flow diagram element.

13. The computer program product of claim 10, comprising generating a process flow diagram catalog of previously developed process flow diagrams.

14. The computer program product of claim 13, comprising identifying a particular process flow diagram from the process flow diagram catalog, the particular process flow diagram being similar to the process flow diagram, wherein the identifying a particular process flow diagram from the process flow diagram catalog comprises (i) converting the previously generated process flow diagrams within the process flow diagram catalog into semantic vectors, (ii) comparing the semantic vectors of the process flow diagram against the semantic vectors of the previously developed process flow diagrams, and (iii) identifying a previously developed process flow diagram whose similarity to the process flow diagram exceeds a predetermined similarity threshold.

15. The computer program product of claim 10, wherein the predicting comprises reconstructing a semantic vector for at least one of (i) a previous process flow diagram element and (ii) a subsequent process flow diagram element, in view of the semantic vector of the process flow diagram element.

16. The computer program product of claim 15, wherein the predicting comprises reverting the semantic vector of the predicted element into a process flow diagram element including (i) text, (ii) an identified swimlane, and (iii) an element type.

17. A method, comprising:
training a machine-learning model, wherein the training comprises (i) receiving developed process flow diagrams, (ii) converting elements and contexts of the elements of the developed process flow diagrams into feature vectors, and (iii) generating a training dataset from the feature vectors, wherein the converting comprises identifying a context of process flow diagram elements within the process flow diagram and wherein the feature vectors are based upon the context of a given process flow diagram element;
receiving an undeveloped process flow diagram comprising at least one process flow diagram element;
converting the undeveloped process flow diagram into at least one feature vector, wherein the converting comprises (iv) identifying a context of the at least one process flow diagram element and (v) representing (a) the context and (b) the at least one process flow diagram element as a feature vector, wherein the feature vector comprises at least element type, swimlane, milestone, and text corresponding to the process flow diagram element; and
generating a prediction with respect to the undeveloped process flow diagram utilizing the at least one feature vector of the undeveloped process flow diagram, wherein the generating comprises (vi) providing the at least one feature vector to the machine-learning model and (vii) receiving the prediction from the machine-learning model, wherein the machine-learning model ingests the feature vector of the undeveloped process flow diagram, analyzes the feature vector of the undeveloped process flow diagram element against the training dataset, and outputs a predicted feature vector for the undeveloped process flow diagram, wherein the predicting comprises converting the predicted feature vector into a predicted process flow diagram element.

* * * * *